United States Patent
Chapman et al.

(10) Patent No.: US 8,743,910 B2
(45) Date of Patent: Jun. 3, 2014

(54) METHOD AND APPARATUS FOR SELECTING A CHANNEL FILTER FOR A COMMUNICATION SYSTEM

(75) Inventors: James Chapman, Cambridge (GB); Martin Leach, Cambridge (GB); Cyril Valadon, Letchworth (GB)

(73) Assignees: MStar Semiconductor, Inc. (KY); MStar Software R&D, Ltd., Shenzhen (CN); Mstar France SAS, Issy les Moulineaux (FR); MStar Semiconductor, Inc. (TW)

( * ) Notice: Subject to any disclaimer, the term of this patent is extended or adjusted under 35 U.S.C. 154(b) by 1311 days.

(21) Appl. No.: 11/662,575

(22) PCT Filed: Sep. 9, 2005

(86) PCT No.: PCT/GB2005/003485
§ 371 (c)(1),
(2), (4) Date: Sep. 6, 2007

(87) PCT Pub. No.: WO2006/027603
PCT Pub. Date: Mar. 16, 2006

(65) Prior Publication Data
US 2008/0101417 A1 May 1, 2008

(30) Foreign Application Priority Data
Sep. 10, 2004 (GB) .................................. 0420184.4

(51) Int. Cl.
*H04J 1/02* (2006.01)
(52) U.S. Cl.
USPC ............................ 370/497; 375/350; 708/300

(58) Field of Classification Search
None
See application file for complete search history.

(56) References Cited

U.S. PATENT DOCUMENTS

| | | | |
|---|---|---|---|
| 5,253,329 A * | 10/1993 | Villarreal et al. | ............... 706/31 |
| 5,465,410 A | 11/1995 | Hiben et al. | |
| 5,870,402 A | 2/1999 | Kelley | |
| 6,470,047 B1 * | 10/2002 | Kleinerman et al. | ......... 375/232 |
| 2003/0043925 A1 * | 3/2003 | Stopler et al. | ............... 375/254 |
| 2003/0099313 A1 | 5/2003 | Li et al. | |
| 2003/0123456 A1 * | 7/2003 | Denz et al. | .................... 370/400 |
| 2004/0032917 A1 * | 2/2004 | Hwang et al. | ............... 375/343 |

FOREIGN PATENT DOCUMENTS

| | | |
|---|---|---|
| EP | 1041726 | 10/2000 |
| EP | 1122891 | 8/2001 |
| EP | 1429469 | 6/2004 |
| WO | WO 03073630 A1 * | 9/2003 |

OTHER PUBLICATIONS

International Search Report dated Jan. 11, 2006.
Search Report Under Section 17, dated Jan. 25, 2005.

* cited by examiner

*Primary Examiner* — Khoa Huynh
(74) *Attorney, Agent, or Firm* — Edell, Shapiro & Finnan, LLC

(57) ABSTRACT

A signal receiver is arranged to process a portion of a received signal in each of a plurality of filter branches and to determine a quality metric for each branch. The configuration of a second filter for processing the entirety of the received signal is subsequently performed according to the determined quality metrics.

21 Claims, 7 Drawing Sheets

METHOD AND APPARATUS FOR SELECTING A CHANNEL FILTER FOR A COMMUNICATION SYSTEM

CROSS-REFERENCE TO RELATED APPLICATIONS

This application is a National Phase Application of PCT/GB2005/003485, which claims priority to GB 0420184.4, which is hereby incorporated by reference.

BACKGROUND OF THE INVENTION

In cellular communication systems, the different users need to share the same access medium, e.g. air. Because the users share the same access medium, their signals will interfere with one another. The level of interference being generated and the corresponding impact on the link quality depends on the network topology and the medium access technique being used. For example, in the E-GPRS system (also known as EDGE—Enhanced Data rate for GSM Evolution) a Time Division Multiple Access (TDMA) scheme is used to multiplex the information of the different users. Every radio frame is divided into 8 time-slots that can potentially be used by 8 separate users. The frequency spectrum is also divided into a number of 200 kHz-spaced carrier frequencies that can be allocated to different cells in the network but re-used on a geographic basis. For any given user in the system, the signals from the other users using the same frequency carrier will generate an increased level of noise (at least within the area of reception of the first user). This source of interference is referred to as Co-Channel Interference (CCI). However, this is not the only source of performance degradation. Signals from users using adjacent frequency carriers, i.e. carriers of adjacent frequency, will also generate interference. This type of interference is referred to as Adjacent Channel Interference (ACI).

An important factor in the resilience of a receiver to interfering signals lies in the design of the different reception filters utilised in the receiver. FIG. 1 shows the different stages that can be found in a typical receiver. Note that these different stages represent the processing performed on the received signal but do not necessarily correspond to an implementation of an actual receiver. Note also that the overall filtering can be split between the mixed-signal decimation filter 104 and any filtering operation performed as part of the demodulation process 107.

It is well known that in the presence of white noise, the reception filter that maximises the Signal to Noise Ratio (SNR) is the matched filter. However, the matched-filtering approach can suffer from a number of drawbacks.

First, if the combination of the transmission and matched filters does not meet the Nyquist pulse criterion, Inter-Symbol Interference (ISI) will be generated. This is the case in the E-GPRS system. FIG. 2 illustrates the Power Spectral Density (PSD) of a transmitted signal following the E-GPRS standard. It can be seen that the pulse shaping function used in this system cannot allow a receive matched filter which meets the Nyquist criterion for ISI free reception due to the overlapping of adjacent pulses. Hence, even though the matched filtering provides the best Signal To Noise Ratio (SNR), it is then required for the demodulation unit to use techniques that can cope with ISI. This will usually increase the complexity of the demodulation process.

Moreover, it can also be seen from FIG. 2 that the filter matched to the transmission pulse shape would not provide a very high rejection of adjacent channel signals. Hence, the reception filter is usually not matched to the transmission pulse shape. Instead, the design of the reception filter is derived as a trade-off between the performance of the receiver in the presence of in-band interference (i.e. CCI) versus the performance when out-of-band interference (i.e. ACI) dominates the noise conditions. In the presence of ACI, it is desirable to have a reception filter with a low cut-off frequency in order to reject as much as possible of the interference. On the other hand, when the noise is dominated by the CCI, the pass-band of the filter should be as wide as possible in order to avoid distortion to the desired signal.

The optimisation of the receiver filter is further complicated when reduced-complexity demodulation techniques are used. The level of ISI generated by the combination of transmission, reception filters and propagation medium will have an impact on the overall performance. Filters providing good interference rejection may not be optimal in terms of overall receiver performance if they generate ISI that cannot be equalised accurately. Equalisation is the term given to the process of estimating the transmitted symbols from the received symbols in the presence of ISI, interference from other users of the spectrum and noise. This process 'undoes' or 'equalises' the distortions arising from the radio channel and Tx/Rx filtering.

The complexity of an equalisation technique depends critically on the number of taps (L) in the channel which is being equalised. When the equalisation technique is based on the Maximum A-Posteriori (MAP) criterion (see *Optimum and sub-optimum detection of coded data disturbed by time-varying intersymbol interference [applicable to digital mobile radio receivers]*, Koch, W.; Baier, A.; Global Telecommunications Conference, 1990, and Exhibition. 'Communications: Connecting the Future', GLOBECOM '90., IEEE, 2-5 Dec. 1990 Pages: 1679-1684 vol. 3) or on Maximum Likelihood Sequence Estimation (MLSE—see *Maximum-likelihood sequence estimation of digital sequences in the presence of intersymbol interference,* Forney, G., Jr.; Information Theory, IEEE Transactions on, Volume: 18, Issue: 3, May 1972 Pages: 363-378) the complexity varies with the number of possible states of the transmitted symbols over the length of the channel. If the number of possible symbols is N, the number of states will be $N^{(L-1)}$. As an example, in the E-GPRS system, the information can be transmitted using an 8 PSK (phase shift keying) modulation, i.e. N=8. In this case, the number of states for a demodulation receiver using a technique based on the Maximum A-Posteriori (MAP) criterion or on the Maximum Likelihood Sequence Estimation (MLSE) will be very high, except for propagation conditions with very low delay spread (i.e. low L). In any realistic environment, the number of states will be too high for an implementation in a mobile receiver to be possible. Hence, reduced complexity techniques such as Delayed Decision Feedback Sequence Estimation (DDFSE) or Reduced State Sequence Estimation (RSSE) are usually used. The performance of those techniques can be very sensitive to the frequency response of the overall channel seen by the receiver. Hence, even though a filter may provide very good interference rejection, the overall demodulation performance may not be very good if the ISI that is generated cannot be equalised accurately.

United States Patent U.S. Pat. No. 6,470,047 B1 describes apparatus and a method of reducing interference in a communications receiver. A received signal is initially filtered using a receive filter to reject out-of-band noise, such as thermal noise. An interference detector subsequently analyses the filtered signal to identify the type of interference present in the received signal. On the basis of this identification a further filter is selected to reject the interference. Two characteristics are used to identify the interference: power spectrum and autocorrelation sequence coefficients.

SUMMARY OF THE INVENTION

According to a first aspect of the present invention there is provided filter apparatus according to claim 1.

According to a second aspect of the present invention there is provided a method of filtering a received signal according to claim 15.

It is thus possible to provide a receiver architecture in which the performance of the demodulation unit is improved by adapting the filtering strategy to the noise conditions. This is achieved by storing two sets of filter configurations in the receiver. For each set, a number of filter configurations are stored. The performance of the receiver is first estimated using the different filter configurations defined in the first set. Using these estimates of the accuracy of the demodulation process, one filter from the second set of stored configurations is selected and applied to the received signal. The resulting samples can then be used to estimate the sequence of transmitted symbols. Note that the two sets of stored filter configurations can be identical. Alternatively, different filter configurations can be used.

For each received burst, the filter best suited to the current conditions is selected from the set of pre-defined configurations. Note that the filter to be applied to the received signal does not need to be calculated for each single burst of received signal from estimates of the noise. Hence, the complexity of a receiver using an embodiment of the present invention is lower than that of previously proposed approaches. Moreover, as there is no attempt to directly try and estimate the noise samples in the signal, the filtering stage can be kept separate from the estimation of the sequence of transmitted symbols. Hence, the filtering selection approach can easily be added to any demodulation receiver, independently of the technique used for the symbol estimation.

In embodiments of the present invention, the number of pre-defined filtering configurations can easily be scaled. The choice for this number can be made as a trade-off between performance and ability to adapt to different noise conditions on the one hand and implementation complexity and memory requirements on the other.

A number of different metrics to be used for the selection of the most suitable filter configuration may be applied to the received signal.

A number of different techniques may also be used for the selection of the best filter configuration. In one embodiment, a normalised difference between the best metric and the metric associated with a default configuration is used for the filter selection. This approach makes it possible to bias the filter selection towards one preferred configuration.

In another embodiment of the receiver architecture, where one of the filter configurations from the first set corresponds to a single impulse (that is, a "straight-through" path), it is possible to reduce the complexity associated with the computation of the receiver quality by directly re-using the channel impulse response estimate for the single impulse filter in the computations associated with other configurations.

In embodiments of the present invention there is no requirement for the estimation of the power spectral density of the noise and/or interference in order to decide on the filter to be selected. The selection of the filter to be applied to the received signal stream can be performed using only an estimate of the residual power. As a result, the computational complexity is significantly lower than that of previously described techniques. Moreover, since the power spectral density of the noise and/or interference does not need to be estimated in order to select the filter to be applied to the received signal, the proposed receiver architecture can be implemented with the demodulation operating at the baud rate.

The apparatus of embodiments of the present invention is fully adaptive with the decision on the filter to be applied being taken on a burst-by-burst basis. The receiver does not need to use memory on the previous decisions in order to process the current burst of received signal. This is advantageous, since in cellular networks, the propagation conditions can vary very rapidly and it is desirable to be able to switch between different filtering strategies in order to match those changes.

Advantageously, embodiments of the present invention can be applied independently of the modulation scheme used in the communication system. Hence, a receiver architecture utilising the present invention is particularly well suited to communication systems using multiple modulation formats.

A receiver architecture utilising embodiments of the present invention is well suited to digital cellular communication systems using a TDMA scheme. For example, significant performance gains can be achieved by E-GPRS receivers using the receiver architecture.

In one embodiment of the present invention to the E-GPRS system, a technique aimed at reducing the implementation complexity is described. Using this technique, it is possible to select the filter to be applied to the received signal without testing all the possible filter configurations from the first set of defined values.

BRIEF DESCRIPTION OF THE DRAWINGS

By way of example only, certain embodiments of the invention will now be described with reference to the accompanying drawings, in which.

DETAILED DESCRIPTION OF THE INVENTION

The present application describes a strategy that takes into account the different, and potentially conflicting, requirements for the design of receiver filters that provide both good interference rejection and accurate ISI equalisation. This is achieved by introducing a filtering stage at the input of the demodulation unit within the receivers. The filter used to shape the received signal is adaptively selected to provide the best performance according to the noise and/or interference conditions.

Figure 1:
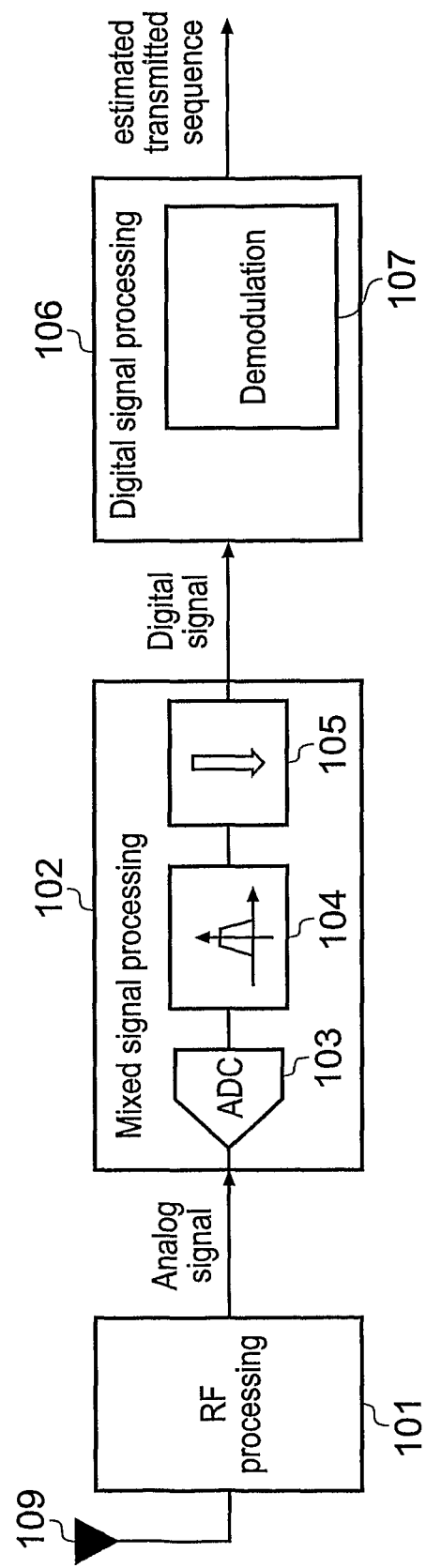
FIG. 1 schematically illustrates the different components found in a prior art digital communications receiver.
Figure 2:
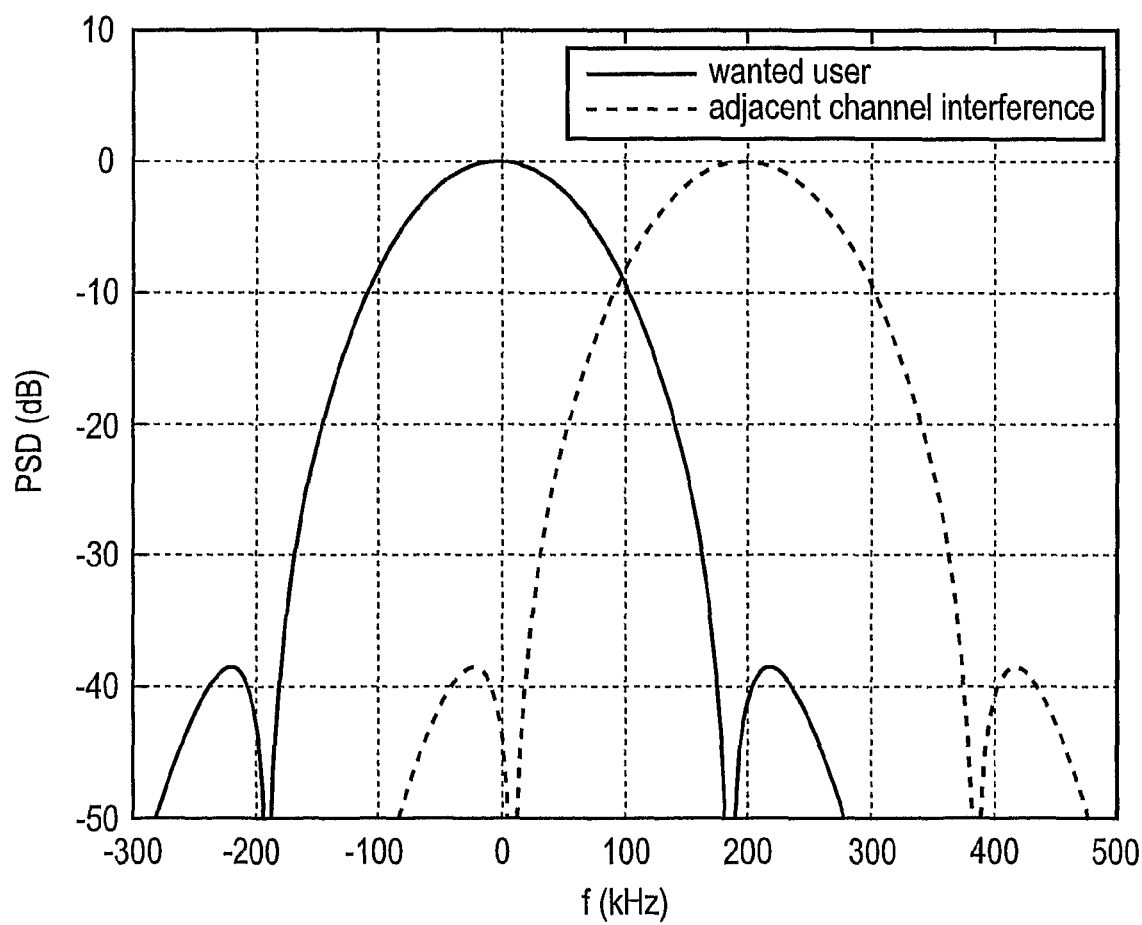
FIG. 2 schematically illustrates an example of the power spectral density of a signal transmitted according to the E-GPRS format.

To adapt the filtering strategy to the noise conditions, it is required that the receiver be able to select the most appropriate filtering configuration. One possible known approach for the selection of the filter to be applied is based on the power spectral estimation of the received signal. For example, it is possible to use detection filters to try and estimate if a significant component of the received power is located at the edges of the frequency bandwidth set by the sampling rate. This can be used to detect the presence of ACI signals. In the presence of an ACI signal, the received filtering can then be designed to provide good out-of-band rejection. However, this approach usually does not perform very well when the demodulation unit operates at the baud-rate. With reference to FIG. 1, because the decimation filter 104 needs to provide good rejection of the components of the signal outside the sampling frequency, the ACI signal will already have been significantly attenuated when it enters the digital signal processing unit 106. This then makes it difficult for the demodulation unit 107 to identify the presence of an ACI signal. This problem is illustrated in FIG. 2. To avoid aliasing in the decimation unit 105, the decimation filter 104 needs to attenuate the frequency components above 135 kHz. However, the ACI signal is centred around 200 kHz, for the example illustrated. Hence, there is enough of the ACI left in the received signal to noticeably degrade the demodulation performance, but not enough for the accurate detection of its presence. For the selection to be made using the power spectral distribution of the received signal, it is beneficial for the signal at the output of the mixed-signal unit 102 to be sampled faster than the baud rate. This will have negative impacts on the power consumption of the receiver as well as on the memory requirements of the digital signal processing unit 106.

In embodiments of the present invention, the selection of the reception filter does not rely on the power spectral estimation of the received signal. As a result of this, it is possible for the proposed receiver to reliably select the best configuration with a digital signal processing unit 106 operating at the baud rate.

Figure 3:
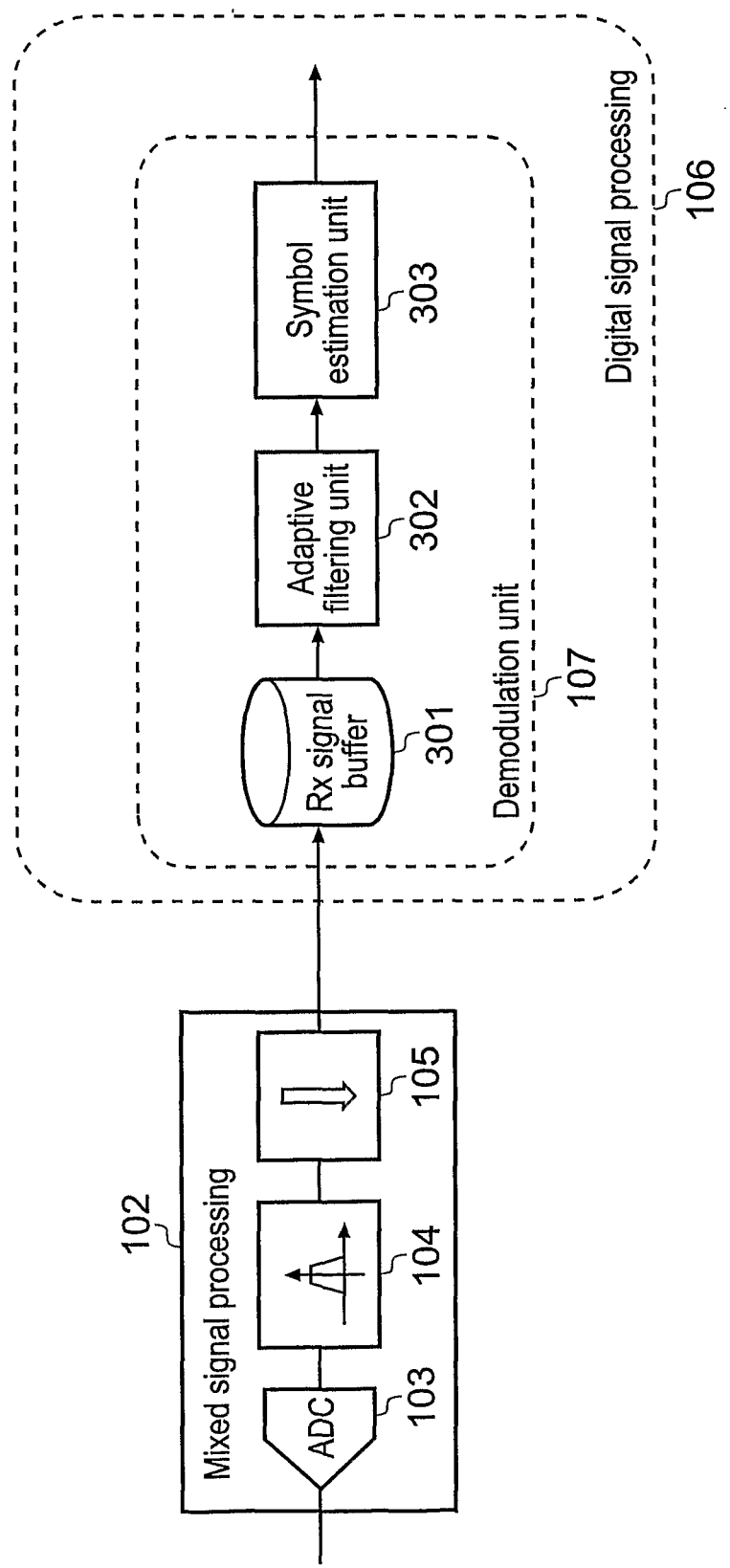
FIG. 3 schematically illustrates the receiver architecture with adaptive filtering processing according to an embodiment of the present invention.

FIG. 3 schematically illustrates a first embodiment of the present invention. Those units common to FIG. 1 are indicated by the same reference number. Digital samples are generated by a mixed signal processing unit 102 and are stored in a received signal buffer unit 301. These samples are then retrieved by a demodulation unit 107 to estimate the sequence of transmitted bits. The first processing stage in the demodulation unit 107 is an adaptive filtering unit 302 that conditions the received signal according to the noise and interference conditions. The resulting filtered signal is then input to a symbol estimation unit 303 that demodulates the signal according to the modulation format used for the transmission.

Since the proposed adaptive filtering unit 302 operates prior to the symbol estimation unit 303, the receiver architecture is not limited in the scope of the demodulation techniques that can be used. For example, in digital cellular communication systems, where ISI distorts the transmitted signal, equalisation techniques such as MAP, MLSE, DDFSE or RSSE can be used.

It is also important to note that the adaptation of the receiver filters is performed in the digital signal processing unit 106, which comprises the signal buffer, adaptive filtering unit and symbol estimation unit. The decimation filter 105 that operates in the mixed signal processing unit 102 does not therefore need to be adapted to the propagation conditions.

The size of the received signal buffer 301 will be largely determined by the transmission format being used. For example in the E-GPRS system, the information is transmitted in blocks of 156.25 symbols. These blocks of information can also be referred to as bursts. It is therefore beneficial, but not required, to size the buffer such that a complete burst can be stored. In this case, the size of the received signal buffer will increase linearly with the number of samples per symbol delivered by the decimation unit 105. In a preferred embodiment of the receiver, the decimation unit 105 is operated at one sample per symbol at the output, thus minimising the memory requirements for the received signal buffer 301.

Figure 4:
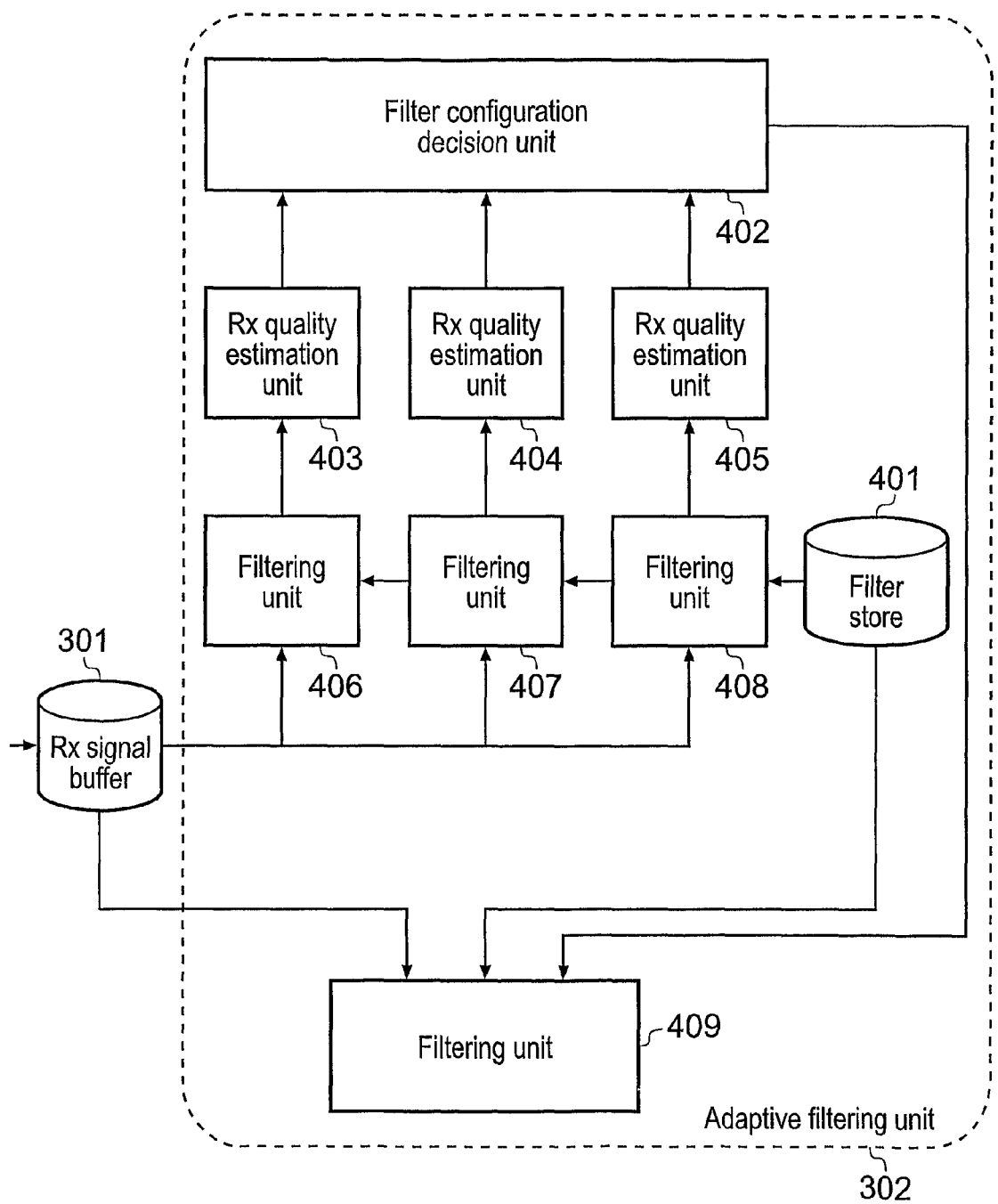
FIG. 4 schematically illustrates the different processing steps of the adaptive filtering architecture of FIG. 3.

FIG. 4 schematically illustrates in more detail the different processing stages included in the adaptive filtering unit 302 of FIG. 3. The adaptive filtering unit 302 includes a memory area 401 where different filter configurations are stored. The design and selection of these different filter configurations will be discussed further on in the description. The filter configurations are used by the different filtering units 406, 407 and 408. It should be noted that each of these filtering units will be configured differently. The filters use samples from the received signal buffer 301 as inputs and the resulting filtered sequences are then processed by the received quality estimation units 403, 404 and 405. Note that the combination of one receiver quality estimation unit with an associated filtering unit will be referred to as one filter hypothesis branch. For example units 403 and 406 form such a branch. The received quality estimation units generate a quality metric for each of the three different filtered sequences. The operation of these units will be described in more detail below. Using the quality metrics associated with the three different filter hypothesis branches, a filter configuration decision unit 402 selects the filter configuration, stored in the memory area 401, which will be used by a filter unit 409 to filter the complete sequence of samples stored in the received signal buffer 301.

In the receiver architecture shown in FIG. 4 the number of filter hypothesis branches is equal to three. Consequently the selection of the filter used for the final filtering unit 409 can be made from a set of three pre-defined configurations. However, it will be appreciated by those skilled in the art that the receiver can easily be modified to operate with any number of filter hypothesis branches.

The number of filter combinations that may be used for the selection of the filter used in unit 409 should be less than or equal to the number of filter hypothesis branches. The size of the filter configuration set used by the filtering unit 409 will in most cases be equal to the number of filter hypothesis branches. However, this is not required for the proposed receiver architecture to operate. Moreover, even when this is the case, there may not necessarily be a direct correspondence between the filter configurations used by the filter hypothesis branches and the final filtering unit 409. It is entirely possible for the configurations used by the filter hypothesis branches to be different from the set of configurations used by the final filtering unit 409.

The filtering operations performed in the hypothesis filter branches and in the final filtering unit 409 can be implemented using any desired technique. The filtering operations can be performed in the frequency domain or may alternatively operate directly in the time domain. Moreover, the proposed receiver architecture does not impose any requirement on the structure of the filters being used. Finite Impulse Response (FIR) or Infinite Impulse Response (IIR) filters could for example be used. It is not even required that the different filter configurations follow the same structure. Some of the filters used either in the filter hypothesis branches or in the final filtering unit 409 can be made of a single impulse.

Advantageously, in communication systems, such as E-GPRS, where multiple modulation formats can be used by the transmitter, it is not required to use the same filter configurations for the different modulation schemes. It is possible to use different filter configuration sets for the different modulation formats.

In some embodiment of the present invention, complexity reduction techniques are used in the implementation of the different filters in the filter hypothesis branches when the impulse responses possess certain defined characteristics. For example, if the impulse responses $H_1(f)$ and $H_2(f)$ of two initial filtering units are such that $H_1(f)=H^*_2(-f)$, the time domain filter coefficients of the two filters will be complex conjugates of one another (the notation * denoting complex conjugation). It is then possible to use this relationship in order to avoid the duplication of some of the computations in the two filtering units. If one of the filtering units uses some of the results of intermediate computations of the other, it is possible to reduce the overall implementation complexity of the receiver.

The filtering operations performed in the filter hypothesis branches and in the final filtering unit 409 are logically identical. However, their implementation may differ. For example, the final filtering unit 409 needs to operate only on the part of the received burst that will be used by the symbol estimation unit 303. For example, GSM burst contains a central core of 26 training symbols (known a priori) surrounded by the data carrying symbols. This means that the different filter hypothesis branches need only operate on the central training sequences (thus reducing complexity compared to the case where the filtering is performed on the whole burst). In contrast, the output of the final filtering stage 409 is used for the symbol estimation. Hence, only the symbols required by the symbol estimation need to be processed. This means that it is possible to avoid filtering the training sequence in the final filtering stage 409 since the training symbols do not need to be estimated—they are known by design. The gain here again is in terms of reduced complexity. To summarise, the two different filtering stages only process the samples required by each particular stage.

It is possible nevertheless for the filters in the filter hypothesis branches to operate on the same part of the burst as the final filtering unit 409. In this configuration, it is possible to reduce the computational complexity of the adaptive filtering by using the same set of filters for the filter hypothesis branches and the final filtering unit 409. The samples produced by the different filters in the filter hypothesis branches can be stored. By so doing, no filtering operation is required by the final filtering unit 409. The stored samples corresponding to the filter configuration being selected by the filter configuration decision unit 402 can be directly retrieved from this set of stored filtered samples.

Figure 5:
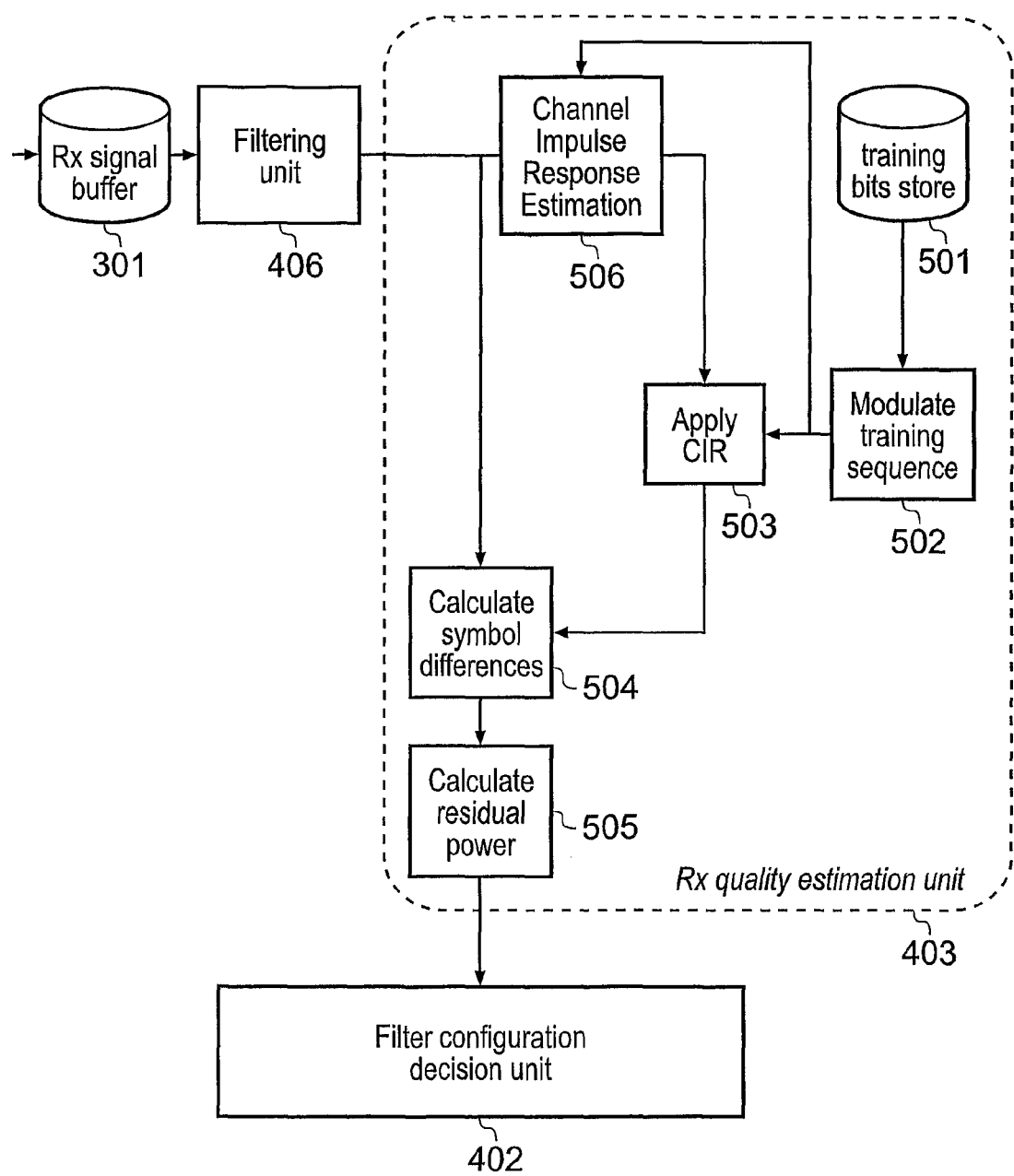
FIG. 5 schematically illustrates the receiver quality estimation unit shown in FIG. 4.

FIG. 5 schematically illustrates a preferred implementation of the receiver quality estimation units 403, 404 and 405 shown in FIG. 4. This implementation is well suited to communication systems where the transmission format includes a sequence of known information bits, as is the case in the E-GPRS system, in which a training sequence of 26 fixed and known symbols is inserted in the burst of information symbols, as explained above. The information bits corresponding to the training sequence are separately stored at the receiver in a training bits store 501 memory area.

The training bits are modulated in a modulation unit 502 with the format used by the transmitter. The resulting modulated symbols are input, together with the samples from the filtering unit 406, to a channel impulse response estimation unit 506. In an alternative embodiment the modulated symbols may be stored directly, in the memory area 501. This reduces, the computational complexity of the receiver through the elimination of the modulation computations. However, this has to be traded off against an increase in memory requirements for the memory area 501.

The output of the channel impulse response estimation unit 506 is an estimate of the channel impulse response (CIR) for the overall transmission link, i.e. the effect of transmission and reception over the channel of an impulse of zero width and infinite amplitude. This channel impulse response estimate includes the effects of the different filters on both the transmission and reception sides as well as distortion introduced by the propagation channel. It will be appreciated that a number of different algorithms may be used for the estimation of the channel impulse response. One example of such techniques is the correlation of the modulated training sequence with the received signal. A possible alternative is to estimate the channel impulse response using a Least Square (LS) fit of the received training sequence.

In the case that one of the filters in the filter hypothesis branches is a single impulse filter, it is possible to reduce the complexity of the computations associated with the derivation of the CIR for the other filter hypothesis branches. In this configuration, the CIR is first estimated for the filter hypothesis branch using the single impulse filter. This process can be performed using the computations previously described. The CIR estimates to be used in the other filter hypothesis branches can then be derived by filtering this initial CIR with the different filters used in the filter hypothesis branches. By so doing, it is possible to directly derive the CIR without the need for estimating it from the received signal.

Referring still to FIG. 5, the CIR determined by the CIR estimation unit 506 is applied to the modulated training sequence output from the modulation unit 502 in a CIR application unit 503. Assuming that the CIR estimation was perfect, this sequence of modulated and filtered training sequence corresponds to the received training sequence without any noise or interference. Hence, an estimate of the residual signal, which includes noise and interference contributions, is derived by calculating the difference between the received training sequence samples and the estimated training sequence samples produced by the CIR application unit 503. This process is performed by a symbol difference calculation unit 504. However, it will be appreciated that the CIR estimation can never be perfect and as a result the training sequence generated by the CIR application unit 503 will be affected by noise. However the power of the noise in the reference training sequence symbols is usually significantly lower than the power of the residual signal. Hence, the output from the symbol difference calculation unit 503 provides a reliable estimate of the residual signal.

The estimated residual samples produced by the symbol difference calculation unit 504 are provided as inputs to a residual power calculation unit 505 that calculates an estimate of the power of the residual signal in the received signal. The residual power estimation unit 505 may be arranged to calculate the sum of the squared amplitudes of the different samples. This residual power estimate is then used by the filter configuration decision unit 402 as a metric measuring the demodulation performance of the received signal using the filter used in the filter hypothesis branch. It will be appreciated by someone skilled in the art that other receiver quality metrics may be derived from the estimated noise samples. Other examples of suitable quality metrics include filtered versions of the residual, e.g. high and low pass to determine whether the residual is comprised of co-channel interference, adjacent channel interference or white noise, or the estimated signal to noise ratio.

An advantage of embodiments of the present invention is that it is not required to estimate the spectral distribution of the noise in the received signal. The selection of the filter to be applied to the received burst only requires an estimate of the total power of the noise. Hence, the implementation complexity of embodiments of the present invention is very low.

A further advantage is that the residual power estimate includes not only the contribution of the noise but that of any interference as well. This includes interference generated by multi-path echoes that are not taken into account in the demodulation process. In fact, the residual power estimate includes the different sources of distortion to the received signal that degrade the accuracy of the demodulation process. Hence, this value is a very good metric for estimating the quality of the symbol estimation process to be performed on the filtered received signal.

In addition, for the derivation of the receiver quality metric, the filtering operations to be performed in each filter hypothesis branch only need to apply to the part of the received signal corresponding to the training sequence. Hence, the whole received burst does not need to be processed by each filter hypothesis branch.

As mentioned above, FIG. 5 illustrates only one of a number of possible embodiments of the receiver quality estimation unit. In an alternative embodiment the symbols corresponding to the transmitted training sequence may be estimated from the received signal for the different hypothesis filter branches. A metric of the quality of the demodulation process is then derived by calculating the number of symbol, or bit, errors in the training sequence. Alternatively, if no training sequence is present in the received signal, a symbol estimation technique may be applied that produces A-Posteriori probabilities for the sequence of transmitted bits. These A-Posteriori probabilities may be combined to derive a receiver quality metric. In fact, any processing technique that produces a metric correlated with the accuracy of the demodulation process may be used for the receiver quality estimation unit.

In the case that the adaptive filtering unit 302 includes N hypothesis filter branches, as shown in FIG. 4, N receiver quality metrics are input to the filter configuration decision unit 402. These N metrics are denoted as $\lambda_i$, $i \in \{0, \ldots, N-1\}$. In one embodiment of the filter configuration unit 402, the filter configuration associated with the filter hypothesis branch providing the best receiver quality metric is selected. Whether the best receiver quality metric corresponds to the one with the minimum or maximum value depends on whether the metrics are negatively or positively correlated with the accuracy of the symbol estimation process.

Figure 6:
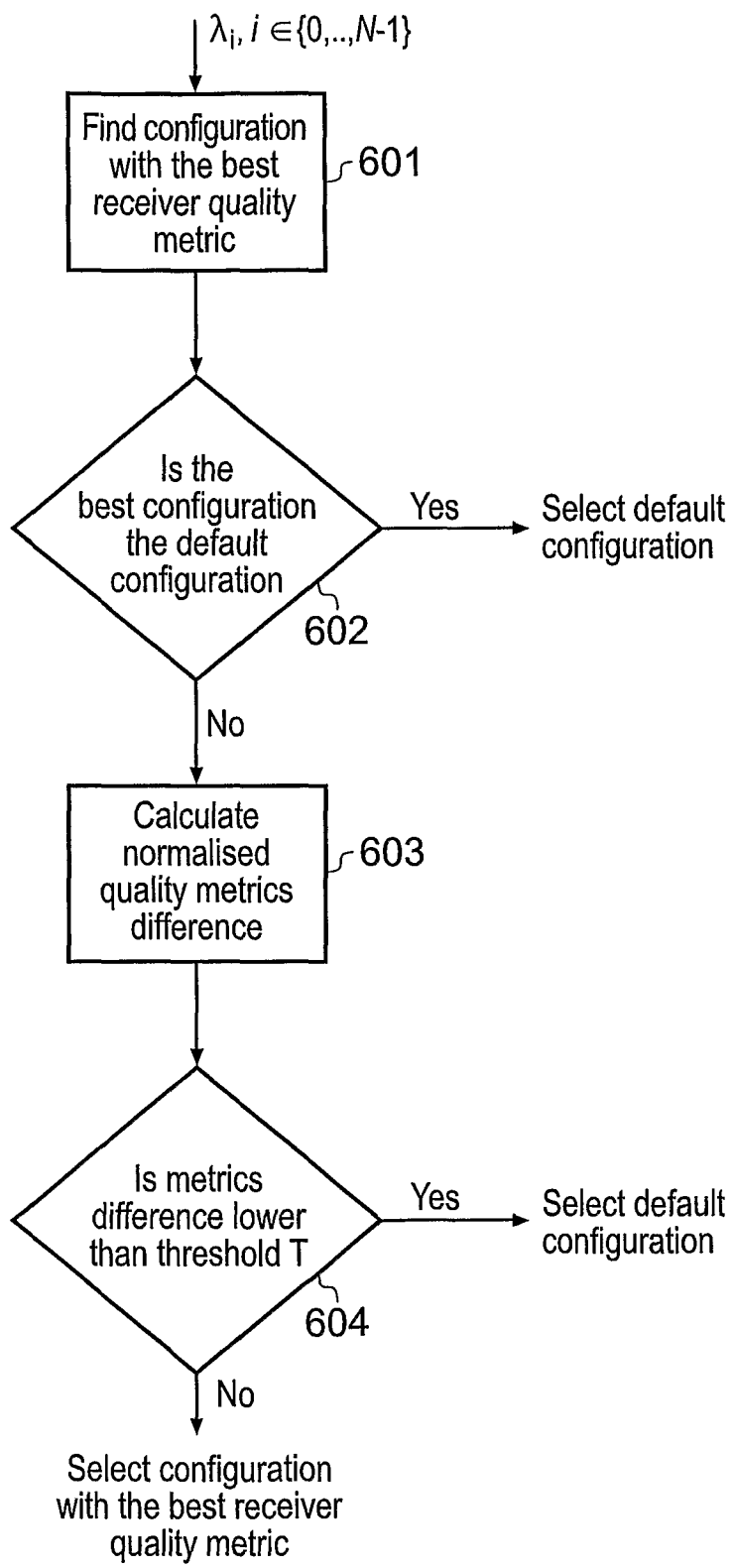
FIG. 6 schematically illustrates the method steps performed in the filter configuration decision unit according to an embodiment of the present invention.

An alternative, preferred, mode of operation of the filter configuration decision unit 402 is illustrated in FIG. 6. One of the filter configurations for the filter hypothesis branches is associated with a default configuration to be used in the final filtering unit 409. The receiver quality metric associated with the default configuration is assumed, without any loss of generality, to be equal to $\lambda_0$. Initially, the filter hypothesis branch with the minimum receiver quality is found from the set of N different values by a first unit 601. If the filter hypothesis branch with the minimum receiver quality metric is the branch (or one of the branches) associated with the default configuration for the final filtering unit 409, determined by a second unit 602, this default configuration is selected. If on the other hand, the result of the test performed in the second unit 602 indicates that the best filter hypothesis branch is not associated with the default configuration, a third unit 603 calculates the following metrics difference;

$$\delta = \frac{\lambda_0 - \min_{i \in \{1, \ldots, N\}}(\lambda_i)}{\lambda_0 + \min_{i \in \{1, \ldots, N\}}(\lambda_i)}$$

The metrics difference $\delta$ is then compared to a pre-defined threshold T in a comparison unit 604. If the metrics difference is lower than a predetermined threshold, the default filter configuration is used for the final filtering unit 409. However, if this is not the case, the filter configuration associated with the best filter hypothesis branch is selected. As this threshold comparison can be implemented without having to perform any division operation the complexity of the operation is reduced. Moreover, it is not required that the decision threshold T be constant. It is possible to adapt the filter selection threshold to the propagation conditions. It will also be appreciated that whilst the units comprising the filter configuration decision unit 402 have been described as separate entities with reference to FIG. 6, they may equally be embodied as one or more integrated units, such as a microprocessor or the like.

In the corresponding description to FIG. 6 of the mode of operation of the filter configuration decision unit 402, the accuracy of the symbol estimation process is taken to be negatively correlated with the receiver quality metric. However, it will be appreciated that the metric may equally be positively correlated with the quality of the symbol estimation process.

Referring back to FIGS. 3 and 4, once the final filter configuration has been selected in unit 402, the received signal is retrieved from the buffer 301 and is filtered in unit 409. The resulting signal can then be used in unit 303 to estimate the sequence of transmitted symbols.

The performance of the receiver architecture according to embodiments of the present invention depends on the different filter configurations being used. The derivation of a possible set of filter configurations is described below for application to the E-GPRS system. It will be appreciated that the proposed set of filter combinations is only one of a number of possible filter combinations that can be used for an E-GPRS receiver.

In the proposed application of the receiver architecture to the E-GPRS system, three filter hypothesis branches are provided. Two of these branches are configured to shape the received signal in the presence of out-of-band noise. The last filter hypothesis branch, which is associated with the default configuration, is designed for the operation of the receiver in the presence of in-band interference.

The same filter configurations for operation in presence of out-of-band noise are used in the filter hypothesis branches and the final filtering unit 409. However, two different configurations may alternatively be used when the main source of noise and/or interference is located in the same frequency bandwidth as the desired signal. In these conditions, the default filter configuration used in the filter hypothesis branch is a single impulse filter. The default configuration used in the final filtering unit 409 corrects the attenuation introduced during the mixed-signal filtering operation 104.

The two filters used to shape the signal in the presence of out-of-band interference are designed to remove the contribution in the received burst of the first adjacent channel signals. The response of the two filters is such that each filter removes interference on one side of the desired signal bandwidth. The filter coefficients of one of the filters are equal to the complex conjugates of the filter coefficients of the other. Hence, by sharing some of the filter computations between the two filter hypothesis branches, the overall receiver implementation complexity is reduced.

One possible derivation of one of the filter for removing remove out-of-band interference will now be described. Let G(z) denote the z-transform of the modulation pulse shape used by the transmitter. The filter used to remove the out-of-band interference is arranged such that the associated z-transform is equal to;

$$\delta(z-\Delta) - \alpha \times G(ze^{2j\pi fT})$$

Where f denotes the difference between the carrier frequency of the desired signal and that of the interfering signal to be removed; T denotes the sampling rate at which the processing is performed in the digital signal processing unit 106, $\Delta$ is an arbitrary delay value and $\alpha$ is a weight used to control the amount of interference being excised from the received signal. The value $\alpha$ may be adapted to the propagation conditions.

The frequency response of the filters may also be made such that any attenuation introduced by the decimation filter 104 on the opposite side of the interference can be compensated for. Furthermore, since the filters applied to the received signal are designed using only knowledge of the average frequency response of the interference and do not require knowledge, or estimation, of the instantaneous frequency characteristics of the interference, the complexity of the receiver is significantly lower than that of previously proposed approaches.

Figure 7:
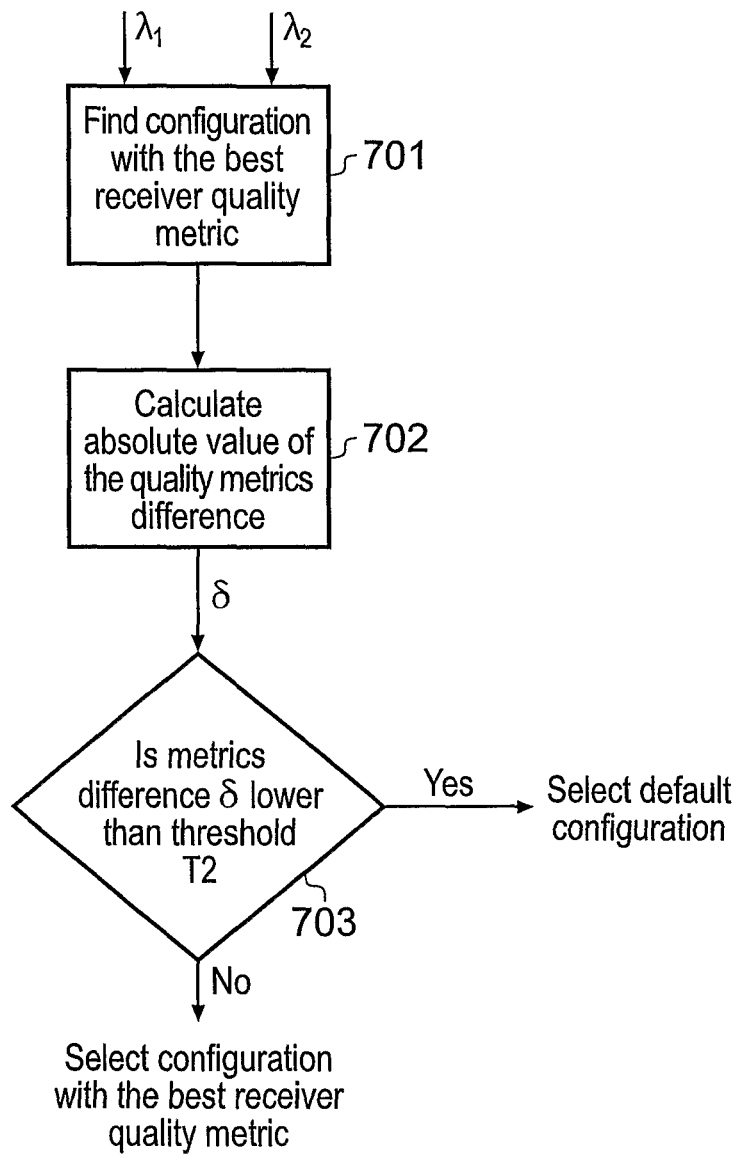
FIG. 7 schematically illustrates the method steps performed in the filter configuration decision unit according to a further embodiment of the present invention.

In a further embodiment the selection of the filter to be applied to the received signal in the final filtering unit 409 can be performed without the need for the receiver to generate a receiver quality metric for the configuration associated with the in-band noise conditions. By so doing, the computations associated with the default filter hypothesis branch are avoided. In this embodiment the filter configuration decision unit 402 is configured as schematically illustrated in FIG. 7. In an analogous manner to the mode of operation describe with reference to FIG. 6, the filter hypothesis branch corresponding to the best receiver quality metric is first identified by a metric assessment unit 701. The difference between the two receiver quality metrics is calculated by a difference calculation unit 702 as follows;

$$\delta = \frac{|\lambda_1 - \lambda_2|}{\lambda_1 + \lambda_2}$$

This difference is then compared, in a comparison unit 703, against a threshold $T_2$. If the value of $\delta$ is lower than the threshold $T_2$, the default filter configuration is selected for the final filtering unit 409. If on the other hand, the metrics difference is larger than the threshold $T_2$, the filter configuration associated with the filter hypothesis branch having the best receiver quality metric is selected. As with the embodiment illustrated in FIG. 6, the individual units may be implemented either separately or as one or more integrated units.

It is thus possible, in accordance with embodiments of the present invention or obvious variants thereof, to provide an improved receiver having improved performance and reduced complexity.

The invention claimed is:

1. A method of filtering a received signal in a communications system, the method comprising:
   storing a received signal;
   providing just a portion of the stored received signal to a plurality of filter assessment branches, each filter assessment branch being arranged to filter the portion using a respective first filter configuration of a first set of filter configurations, wherein at least a first of the first plurality of filter assessment branches includes a single impulse response filter as a first filter configuration, and each of the remaining ones of the first plurality of filter assessment branches include a different first filter configuration;
   generating an initial channel impulse response (CIR) estimate using the first assessment branch;
   distributing the initial CIR estimate among remaining ones of the plurality of filter assessment branches;
   filtering the distributed CIR estimates using corresponding filter assessment branches to obtain filtered CIR estimates without the need for estimating the CIR from the received signal;
   generating filter quality assessment metrics from the initial CIR estimate and the filtered CIR estimates;
   selecting a second filter configuration from a second set of filter configurations in dependence upon the filter quality assessment metrics; and
   applying the received signal to a filter associated with the second filter configuration, wherein a number of filter configurations in the second set of filter configurations is less than or equal to a number of filter assessment branches.

2. A method according to claim 1, wherein each filter configuration in the second set of filter configurations has a same configuration as one of the first filter configurations.

3. A method according to claim 1, wherein the step of selecting the second filter configuration includes determining the filter assessment branch having a best filter performance and selecting a corresponding second filter configuration.

4. A method according to claim 1, the method further comprising:
   allocating one of the first set of filter configurations as a default second filter configuration, the default second filter configuration corresponding to one of the filter assessment branches;
   generating a filter performance value for each of the filter assessment branches; and
   if the filter assessment branch to which the default second filter configuration corresponds has a best filter performance value, selecting the default second filter configuration.

5. A method according to claim 4, wherein when the filter assessment branch having the best filter performance value does not correspond to the default second filter configuration, the method further comprises:
   calculating a difference measure between the best filter performance value and the filter performance value of the filter assessment branch to which the default second filter configuration corresponds;
   comparing the difference measure with a first threshold value; and
   if the difference measure exceeds the first threshold value, selecting a second filter configuration corresponding to the filter assessment branch having the best filter performance value, otherwise selecting the default second filter configuration.

6. A method according to claim 1, wherein the method further comprises:
   generating a filter performance value for a first and a second filter assessment branch;
   calculating a difference measure between the performance values of the first and second filter assessment branches;

comparing the difference measure with a second threshold value; and if the difference measure exceeds the second threshold value, selecting the filter from the filter assessment branch having a best filter performance.

7. A method according to claim 6, the method further comprising:

allocating one of the first set of filter configurations as a default second filter configuration; and if the difference value does not exceed the second threshold value, selecting the default second filter configuration.

8. A method according to claim 1, wherein the step of assessing the quality of the filtered signal for each filter assessment branch comprises:

generating an estimate of an impulse response of the communications channel;

applying the estimated channel impulse response to a stored signal that is substantially identical to at least a portion of the originally transmitted signal;

determining the difference between the stored signal to which the estimated channel impulse response has been applied and that the output signal from the first filter configuration; and calculating the signal power of the determined difference, the signal power being indicative of the filter performance.

9. A filter apparatus for use in a communications signal receiver, the filter apparatus comprising:

a received signal buffer arranged to store a received signal;

a digital signal processor configured to:

configure a first plurality of filters such that each of the first plurality of filters comprises different filter characteristics, wherein at least a first filter of the first plurality of filters comprises a single impulse response filter;

generate an initial channel impulse response (CIR) estimate from a portion of the stored signal comprising a training sequence using the single impulse response filter of the first filter;

distribute the initial CIR estimate among remaining ones of the first plurality of filters;

filter at least one distributed CIR estimate using a second filter of the first plurality of filters to obtain a filtered CIR estimate;

generate first and second receive quality metrics by respective quality estimation functions of the digital signal processing section using the initial CIR estimate and the filtered CIR estimate, respectively; and select one of a plurality of second filters based on the first and second receive quality metrics.

10. The filter apparatus according to claim 9, wherein the selected second filter has a same configuration as a filter of the first plurality of filters used to generate a CIR corresponding to the selected quality metric.

11. The filter apparatus according to claim 9, wherein the received signal buffer is arranged to store the received signal sampled at one sample per symbol or sampled at a baud rate for subsequent demodulation at a corresponding sample rate.

12. The filter apparatus according to claim 9, wherein the digital signal processor is further configured to determine whether the second selected filter includes a default filter configuration.

13. The filter apparatus according to claim 12, wherein when the second selected filter does not include the default filter configuration, the digital signal processor is further configured to calculate a normalized difference between a default quality metric and the quality metric associated with the second selected filter, and to select the default filter configuration as the selected second filter when the normalized difference does not exceed a threshold.

14. The filter apparatus according to claim 12, wherein when the second selected filter does not include the default filter configuration, the digital signal processor is further configured to calculate an absolute difference between the quality metric associated with the second selected filter and a quality metric associated with another of the plurality of first filters, and to select the default filter configuration as the selected second filter when the absolute difference does not exceed a threshold.

15. The filter apparatus according to claim 12, wherein the default filter configuration is designed for in-band noise condition and remaining filters are designed for out-of-band noise conditions.

16. The filter apparatus according to claim 9, wherein the digital signal processor is configured to select the second selected filter based on whether the first and second quality metrics indicate whether interference in the received signal is based on at least one of Co-Channel Interference (CCI), Adjacent Channel Interference (ACI), and white noise, or the signal to noise ratio of the received signal.

17. The filter apparatus according to claim 9, wherein the first and second receive quality metrics comprise an estimate of a residual power of the received signal.

18. The filter apparatus according to claim 9, wherein the plurality of first filters each include a channel impulse response estimation function and the digital signal processor is further configured to generate an estimate of an impulse response of a signal transmission channel and to apply the estimated channel impulse response to stored training sequences, one of which is substantially identical to the training signal.

19. The filter apparatus according to claim 18, wherein the plurality of first filters each include a channel impulse response estimation function and the digital signal processor is further configured to determine a difference between the filtered received signal and the stored signal to which the estimated impulse response has been applied and to calculate the signal power of the determined difference.

20. The filter apparatus according to claim 9, wherein the digital signal processor is configured to obtain the filtered CIR estimates without the need for estimating the CIR from the received signal.

21. The filter apparatus according to claim 9, wherein the digital signal processor is further configured to:

store samples of the training sequence produced by the first and second filters; and filter portions of the received signal not comprising the training sequence using the selected second filter to obtain filtered data such that the filtered data and corresponding stored samples produce a complete sample set for the received signal without filtering the training sequence using the selected second filter.

* * * * *